UNITED STATES PATENT OFFICE.

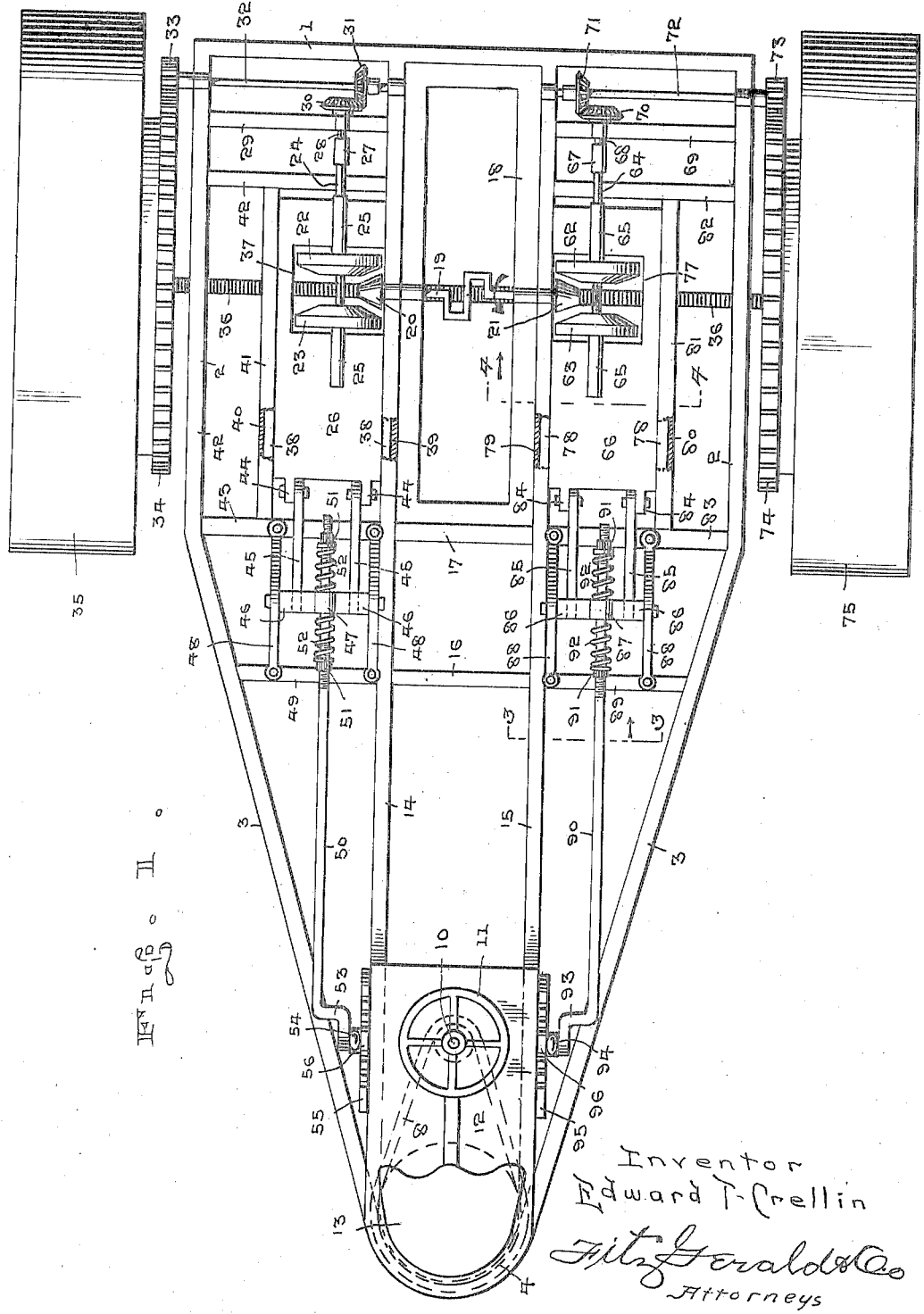

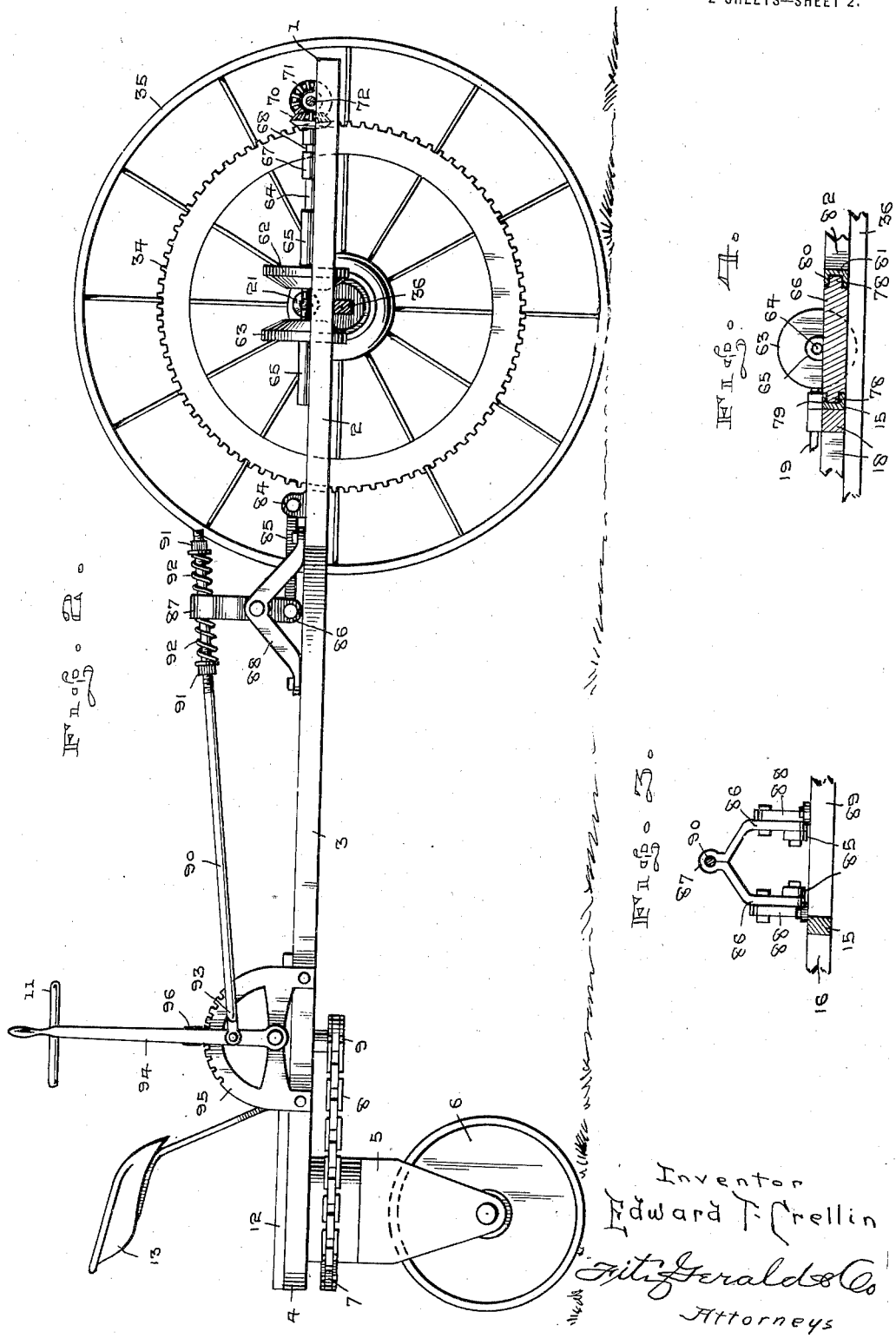

EDWARD T. CRELLIN, OF PENDER, NEBRASKA.

TRACTOR TRANSMISSION DEVICE.

1,302,769.   Specification of Letters Patent.   Patented May 6, 1919.

Application filed September 15, 1917. Serial No. 191,601.

*To all whom it may concern:*

Be it known that I, EDWARD T. CRELLIN, a citizen of the United States, residing at Pender, in the county of Thurston and State of Nebraska, have invented certain new and useful Improvements in Tractor Transmission Devices; and I do hereby declare the following to be a full, clear, and exact description of the invention, such as will enable others skilled in the art to which it appertains to make and use the same.

My invention relates to tractor transmission devices, and is more particularly designed for tractors employed in agricultural pursuits, though the same is not restricted to this specific use as the same is capable of being readily employed upon any of the well known self propelled vehicles.

One of the objects of my invention is to produce a device of this character that is capable of turning sharp corners in either direction by the specific operations of the traction wheels in addition to the tractor steering mechanisms.

Another object of my invention is to so construct the tractor that the engine and the transmission mechanisms are located in proximity to the traction wheels so that the weight of the engine and the transmission mechanisms are borne by the traction wheels and at the same time provide for the employment of shorter shafts for preventing loss of the engine power which is the case when longer shafts have to be employed.

Another object of this invention is to provide independent operating means for each of the traction wheels whereby the traction wheels may be simultaneously operated in forward direction or rearward direction, or the traction wheels operated in reverse directions to each other, or one traction wheel maintained in neutral position while the other is being operated in either forward or rearward direction.

Another object of this invention is to provide independently operable frictional transmission members which are mounted in a manner to be bodily slidable with their shafts and with respect to the engine shaft so as to obviate the necessity of feathered or slidably keyed gearing and the like.

Another object of this invention is to provide shifting levers for the slidable mountings of the friction members and positioning the same within easy reach of the operator of the tractor and to provide resilient connections between the shifting levers and the mountings for the frictional members whereby to maintain the frictional members in resilient and constant engagement with the friction members upon the engine shaft.

Another object of this invention is to provide a tractor and the transmission mechanism therefor which consists of few parts, strong and durable, efficient in operations, free from excessive strains and wear, and economical to manufacture and maintain.

These and other objects and advantages will more fully appear as the nature of the invention is more clearly understood from the following description taken in connection with the accompanying drawings wherein there is disclosed one embodiment of the invention, but which is susceptible to numerous variations and alterations in the form, construction and arrangement of the parts to meet the exigencies of the case without departing from the spirit of the invention or exceeding the scope of the claims.

In the drawings:

Figure 1 is a top view of the invention.

Fig. 2 is a side view thereof with one of the traction wheels removed.

Fig. 3 is a sectional view on line 3—3 of Fig. 1 and looking in the direction of the arrow, showing the detail construction of one of the rocking levers employed.

Fig. 4 is a sectional view on line 4—4 of Fig. 1 and looking in the direction of the arrow, showing the detail construction of the mounting of the frictional transmission members.

Referring to the drawings, wherein similar reference characters denote corresponding parts throughout the several views, the frame of the tractor consists of the front rail 1, the side rails 2 which are provided with the converging rearwardly extending rails 3 which terminate in the circular rear end portion 4 in which is revolubly mounted the guide wheel post 5 carrying the guide wheel 6 and provided with the tiller wheel 7 connected by the chain 8 with the sprocket wheel 9 upon the lower end of the shaft 10 provided at its upper end with the steering wheel 11, the shaft 10 passing upwardly through the platform 12 upon this end of the frame which has suitably secured thereon the seat 13.

While the left hand half and the right hand half of the machine are similarly constructed separate reference characters will be employed for the sake of clearness in illustrating the invention and describing the operation thereof and wherein the left hand side of the machine will be first described.

Extending longitudinally through the substantially central portion of the frame from the rear end to the forward end thereof are the parallel spaced bars 14 and 15 having their central portions reinforced by the cross bars 16 and 17 and suitably mounted in the forward portion of the frame between the rail 1 and the bars 14, 15 and 17 is the frame 18 for supporting any well known type of two cylinder engine (not shown). However, the crank shaft 19 of the engine is shown suitably journaled upon the bars 14 and 15 and the frame 18, the crank shaft 19 being disposed transversely of the machine and having suitably mounted upon its ends the beveled friction driving wheels 20 and 21, preferably formed of fiber.

Adapted to be driven by the friction wheel 20 are the metal beveled friction wheels 22 and 23 rigidly secured upon the shaft 24 mounted in the bearings 25 upon the slidable plate 26 which is moved longitudinally backward and forward in a manner to be hereinafter described. The shaft 24 has the telescopic connection 27 with the stub shaft 28 suitably journaled upon the cross bar 29 of the frame and provided with the beveled gear 30 which meshes with the beveled gear 31 on the counter shaft 32 suitably journaled upon the frame in a transverse direction and has upon its outer end the gear pinion 33 in mesh with the gear wheel 34 of the left hand traction wheel 35 which is revolubly but loosely mounted upon one end of the axle 36 which extends entirely across and is secured in any suitable manner upon the under side of the machine.

The plate 26 is preferably formed of a heavy casting and formed with the cutaway or slotted portion 37 for accommodating the wheels 22 and 23 and is provided at its side edges with the tongues 38 which are slidably mounted in the groove 39 formed in the side of the bar 14 and the groove 40 formed in the side of the bar 41 which extends from the strut 42 to the strut 43. Upon the rear end of the plate 26 are the ears 44 to which are pivotally connected one end of the links 45 which have their opposite ends pivotally connected to the legs 46 of the bifurcated rocking lever 47 having its furcations centrally pivotally mounted upon the spaced brackets 48 having their respective ends suitably secured upon the strut 43 and the strut 49 of the frame. For rocking the rocking lever 47 for moving the sliding plate 26 to and fro the rod 50 is provided and has its forward end slidably mounted through the upper portion of the rocking lever 47, the end portion of the rod 50 being provided with spaced threaded portions upon which are threaded the nuts 51 in spaced relation to each other and at either side of the rocking lever 47 and interposed between the nuts 51 and the adjacent faces of the lever 47 are the springs 52 for establishing an adjustable resilient connection between this end of the rod 50 and the upper portion of the rocking lever 47. The rear end portion of the rod 50 is formed with the angle member 53 and has its rear end pivotally connected to the operating lever 54 which is pivotally mounted upon the segmental rack 55 suitably secured upon the bar 14 and at the left side of the platform 12, the lever 54 being provided with the thumb latch 56 for engaging the teeth of the segmental rack 55.

I will now describe the construction of the right hand half of the machine. Adapted to be driven by the friction wheel 21 are the metal beveled friction wheels 62 and 63 rigidly secured upon the shaft 64 mounted in the bearings 65 upon the slidable plate 66 which is moved longitudinally backward and forward in a manner to be hereinafter described. The shaft 64 has the telescopic connection 67 with the stub shaft 68 suitably journaled upon the cross bar 69 of the frame and provided with the beveled gear 70 which meshes with the beveled gear 71 on the counter shaft 72 suitably journaled upon the frame in a transverse direction and has upon its outer end the gear pinion 73 in mesh with the gear wheel 74 of the right hand traction wheel 75 which is revolubly but loosely mounted upon the other end of the axle 36 which, as before stated, extends entirely across and is secured in any suitable manner upon the under side of the machine.

The plate 66 is preferably formed of a heavy casting and formed with the cutaway or slotted portion 77 for accommodating the wheels 62 and 63 and is provided at its side edges with the tongues 78 which are slidably mounted in the groove 79 formed in the side of the bar 15 and the groove 80 formed in the side of the bar 81 which extends from the strut 82 to the strut 83. Upon the rear end of the plate 66 are the ears 84 to which are pivotally connected one end of the links 85 which have their opposite ends pivotally connected to the legs 86 of the bifurcated rocking lever 87 having its furcations centrally pivotally mounted upon the spaced brackets 88 having their respective ends suitably secured upon the strut 83 and the strut 89 of the frame. For rocking the rocking lever 87 for moving the sliding plate 66 to and fro the rod 90 is provided and has its forward end slidably mounted through the upper portion of the rocking lever 87, the end portion of the rod 90 being provided with spaced threaded portions upon which are threaded the nuts 91 in spaced relation to each other and at either side of the rocking lever 87 and interposed between the nuts 91 and the adjacent faces of the lever 87 are the springs 92 for establishing an adjustable resilient connection between this end of the rod 90 and the upper portion of the rocking lever 87. The rear end portion of the rod 90 is formed with the angle member 93 and has its rear end pivotally connected to the operating lever 94 which is pivotally mounted upon the segmental rack 95 suitably secured upon the bar 15 and at the right side of the platform 12, the lever 94 being provided with the thumb latch 96 for engaging the teeth of the segmental rack 95.

The operation of the machine will be briefly described as follows:

Assuming the engine shaft 19 to be turning in the direction indicated by the arrow and it is desirous of driving the machine in a forward direction the levers 54 and 94 are thrown in a forwardly direction by the operator which slides the plates 26 and 66 forwardly which brings the beveled wheels 23 and 63 in engagement with the beveled wheels 20 and 21 of the engine shaft 19, whereby power will be imparted to the shafts 24 and 64 and to the counter shafts 32 and 72 and thence to the gear wheels 34 and 74 which will drive the traction wheels 35 and 75 forwardly. Should it be desirable to turn the machine to the left more acutely than can be attained by operating the steering mechanisms, the operator will draw the lever 54 rearwardly to its neutral point which movement will position the wheels 23 and 22 equally spaced from the wheel 20 of the engine shaft 19 whereby the traction wheel 35 will remain stationary while the traction wheel 75 continues forwardly. Should it be desirable, however, to turn more acutely than can be done with this operation the operator will move the lever 54 sufficiently rearwardly for causing the wheel 22 to engage the wheel 20 of the engine shaft 19 and in this instance the shafts 24 and 32 will be revolved in the opposite direction and likewise the gear wheel 34 of the traction wheel 35 so that the traction wheel 35 will now be driven rearwardly and thereby cause the machine to make a much shorter turn. Should it be desirable to turn to the right, assuming that the lever 54 is now thrown forward for driving the traction wheel 35 in a forward direction, the lever 94 may be thrown rearward to neutral for maintaining the wheels 62 and 63 in spaced relation to the wheel 21 of the engine shaft 19, or the lever 94 may be thrown still farther rearward for causing the wheel 62 to engage the wheel 21 for driving the traction wheel 75 rearwardly while the traction wheel 35 is still moving in a forwardly direction. Should it be desirable to move the machine rearwardly the levers 54 and 94 are both thrown rearwardly for sliding the plates 26 and 66 rearwardly for causing the wheels 22 and 62 to engage the wheels 20 and 21 of the engine shaft 19 and in this instance the shafts 24 and 64 and the counter shafts 32 and 72 will be revolved in the opposite direction to that above set forth for driving the machine forwardly and the gear wheels 34 and 74 together with the traction wheels 35 and 75 will be driven rearwardly.

Any suitable form of changeable speed mechanisms may be employed at any suitable points between the engine shaft 19 and the traction wheels 35 and 75, and while I have shown the beveled gears 30, 31 and 70, 71 for connecting the stub shafts 28 and 68 with the counter shafts 32 and 72 I may employ any suitable form of worm gearing or other suitable connections between these parts, and I may also employ chain and sprocket connections between the counter shafts 32 and 72 and the traction wheels 35 and 75 in lieu of the pinions 33 and 73 and the gear wheels 34 and 74 shown in the drawings.

I preferably form the beveled friction wheels 20 and 21 of fiber and the beveled friction wheels 22, 23 and 62, 63 of metal as this attains the best results, though other materials may be employed if desired.

Instead of forming the plates 26 and 66 with the tongues upon their side edges, the plates may be made thicker and their side edges formed with grooves so that the plates 26 and 66 will slidably embrace the adjacent bars and thereby dispense with the grooves in the bars.

While I have shown the tractor constructed with the traction wheels at the front of the machine and the steering wheel at the rear, I may also construct the machine with the traction wheels at the rear and the steering wheel at the front, or I may provide the machine with four wheels instead of three as shown, and in any case the frame is mounted at a substantial height above the ground so that a plow or other farm machinery may be secured to the under side of the frame and preferably in close proximity to the traction wheels.

Having described my invention, what I claim as new and desire to secure by Letters Patent, is:

1. In a device of the character specified, the combination of a frame, traction wheels upon said frame, a motor upon said frame, a transmission mechanism interposed between each of said traction wheels and said motor, supporting plates for driving members of said transmission mechanism slidably mounted upon said frame, and means for actuating said supporting plates and driving members of said transmission mechanism independently of each other for driving said traction wheels.

2. In a device of the character specified, the combination of a frame, traction wheels upon said frame, a motor upon said frame, longitudinal guideways within said frame, elongated plates slidably mounted within said guideways, transmission mechanisms interposed between said traction wheels and said motor, and having driving members carried by said plates, and means for actuating said supporting plates together with said members independently of each other for driving said traction wheels.

3. In a device of the character specified, the combination of a frame, traction wheels upon said frame, a motor upon said frame, guideways within said frame, plates slidably mounted within said guideways, driving members carried by said plates, transmission mechanisms between said driving members and the traction wheels, operating rods for actuating said plates together with said members, and resilient connections between said operating rods and plates to provide cushioning members therebetween.

4. In a device of the character specified, the combination of a frame, traction wheels upon said frame, a motor, countershafts upon said frame operatively connected with said traction wheels, stub shafts operatively connected with said countershafts, driving mechanisms interposed between said motor and said stub shafts, telescopic connections between said driving mechanisms and said stub shafts, guideways upon said frame, and plates slidably mounted in said guideways and carrying said driving mechanisms for transmitting power to said traction wheels for driving the latter in either direction.

5. In a device of the character specified, the combination of a frame, traction wheels upon said frame, a motor, countershafts upon said frame operatively connected with said traction wheels, stub shafts operatively connected with said countershafts, driving mechanisms interposed between said motor and said stud shafts, telescopic connections between said driving mechanisms and said stub shafts, guideways upon said frame, plates slidably mounted in said guideways and carrying said driving mechanisms for transmitting power to said traction wheels for driving the latter in either direction, and a manually operable steering wheel revoluble upon a vertical axis and provided with a guide wheel to coöperate with said traction wheels to turn the device.

In testimony whereof I have signed my name to this specification in the presence of two subscribing witnesses.

EDWARD T. CRELLIN.

Witnesses:
JOHN C. LAUGHLIN,
E. G. HANCOCK.